US009199320B2

(12) United States Patent
Stroud

(10) Patent No.: US 9,199,320 B2
(45) Date of Patent: Dec. 1, 2015

(54) PIVOTING WATER BLOCK GUIDE ASSEMBLY FOR CIRCULAR GANG SAWS

(71) Applicant: Gary Arthur Stroud, West Kelowna (CA)

(72) Inventor: Gary Arthur Stroud, West Kelowna (CA)

(*) Notice: Subject to any disclaimer, the term of this patent is extended or adjusted under 35 U.S.C. 154(b) by 0 days.

(21) Appl. No.: 13/804,763

(22) Filed: Mar. 14, 2013

(65) Prior Publication Data

US 2013/0263711 A1    Oct. 10, 2013

(30) Foreign Application Priority Data

Apr. 10, 2012 (CA) .................................... 2773792

(51) Int. Cl.
| | |
|---|---|
| *B23D 59/02* | (2006.01) |
| *B23D 45/10* | (2006.01) |
| *B27B 5/34* | (2006.01) |
| *B27B 3/36* | (2006.01) |
| *B27B 5/29* | (2006.01) |

(52) U.S. Cl.
CPC ................ *B23D 59/02* (2013.01); *B23D 45/10* (2013.01); *B23D 59/025* (2013.01); *B27B 3/36* (2013.01); *B27B 5/29* (2013.01); *B27B 5/34* (2013.01); *Y10T 83/263* (2015.04); *Y10T 83/8889* (2015.04)

(58) Field of Classification Search
CPC . Y10T 83/263; Y10T 83/0443; Y10T 83/283; Y10T 83/293; Y10T 83/8878; Y10T 83/888; Y10T 83/8884; Y10T 83/0453; Y10T 83/2066; Y10T 83/6584; Y10T 83/9457; B23D 59/02; B23D 59/025; B23D 45/10; B23D 45/102; B27B 5/06; B27B 5/34; B27B 5/30; B27B 33/04; F16M 11/06; F16M 11/08; F16M 11/14; F16M 200/08

USPC ............. 83/169, 22, 170, 171, 821, 823, 826, 83/24, 98, 425, 698.11; 248/180.1, 181.1, 248/181.2, 188.1, 188.2, 188.3
See application file for complete search history.

(56) References Cited

U.S. PATENT DOCUMENTS

| | | | | |
|---|---|---|---|---|
| 1,402,998 | A | * | 1/1922 | Anderson .................. 248/188.2 |
| 3,361,410 | A | * | 1/1968 | Messer ......................... 254/101 |
| 3,645,304 | A | * | 2/1972 | Thrasher ........................ 83/821 |
| 3,920,296 | A | * | 11/1975 | Eckhardt ....................... 384/564 |

(Continued)

FOREIGN PATENT DOCUMENTS

| | | |
|---|---|---|
| CA | 2773792 | 7/2012 |
| DE | 3505503 | 8/1986 |

OTHER PUBLICATIONS

Office action dated Sep. 27, 2012 in related case 2,773,792.

*Primary Examiner* — Phong Nguyen
(74) *Attorney, Agent, or Firm* — Alchemy-Partners, PC

(57) ABSTRACT

A two-part pivotable block component for mounting onto a sawguide post of a sawguide assembly for a circular gang saw. The two-part pivotable block component comprises an upper first part that is integrally engagible with the sawguide post and a lower second part having an orifice for receiving therethrough the sawguide post. The first part of the pivotable block component has an inclined surface in a first plane for pivotably engaging an inclined surface provided therefore on the second part of the pivotable block component. The inclined surface of the second part of the pivotable block component is in a second plane. The first part of the pivotable block component may be integrally incorporated into a sawguide post. The first part of the pivotable block component may have one or more channels for flowing a coolant therethrough.

17 Claims, 9 Drawing Sheets

(56) References Cited

U.S. PATENT DOCUMENTS

| | | | |
|---|---|---|---|
| 4,575,034 A * | 3/1986 | Tobey | 248/188.9 |
| 4,576,357 A | 3/1986 | Schrepfer | |
| 5,080,319 A * | 1/1992 | Nielsen | 248/669 |
| 5,159,866 A * | 11/1992 | Dunham | 83/169 |
| 5,809,859 A * | 9/1998 | Stroud et al. | 83/829 |
| 5,921,162 A * | 7/1999 | Jackson et al. | 83/829 |
| 6,138,979 A * | 10/2000 | Morman | 248/638 |
| 6,230,600 B1 * | 5/2001 | Stroud | 83/665 |
| 6,705,188 B2 * | 3/2004 | Gravely et al. | 83/22 |
| 6,877,411 B2 * | 4/2005 | McGehee et al. | 83/425.4 |
| 6,938,872 B2 | 9/2005 | Nygaard | |
| 7,717,395 B2 | 5/2010 | Rowan, Jr. et al. | |
| 2002/0008187 A1 | 1/2002 | Ganter | |

* cited by examiner

PIVOTING WATER BLOCK GUIDE ASSEMBLY FOR CIRCULAR GANG SAWS

CROSS-REFERENCE TO RELATED APPLICATIONS

This application claims the benefit of Canadian Application 2,773,793, filed 10 Apr. 2012, which is hereby incorporated by reference in its entirety as if fully set forth below.

TECHNICAL FIELD

The present disclosure relates to sawguide assemblies for circular gang saws. More particularly, the present disclosure relates to components mountable into sawguide assemblies to enable rapid alignment adjustments.

BACKGROUND

Production of lumber from raw logs typically involves a first step, called primary breakdown, of recovering an elongate square center from a log using head rig equipment. Head rigs generally comprise a large stationary circular saw or a band saw and a travelling carriage. The travelling carriage rotationally transports a log back and forth through the head rig to remove a series of rounded slabs from outer edges of the log thereby producing the squared center of the log which is commonly called a "cant". In some processes, cants are produced with two squared-off opposing sides. Primary breakdown typically produces 2-sided and 4-sided cants, rounded edge slabs, and sometimes, large boards.

The cants, slabs and boards produced during primary breakdown are further processed during secondary breakdown processes whereby large rectangular side flitches having two opposing parallel sides, are cut from the sides of cants with band saws or circular saws. Flitches are then typically broken down into functional lumber with equipment having multiple parallel circular saw blades mounted onto a fixed driven arbor, commonly known as circular gang saws. The processing step for producing flitches from cants is known as "reducing" while production of functional lumber from flitches comprises multiple steps referred to as "edging" and "re-sawing". High-volume through-put systems often combine the reducing and edging steps into one piece of equipment operating under high saw speeds to enable rapid cutting of wood against high pressures forced by rapid through-put of cants and flitches.

Pressing forces applied by high-volume throughput of flitches and lumber pieces against circular gang saws often cause undesired lateral movements and vibrations of individual saw blades resulting in deterioration in blade stability and reduced dimensional accuracy in the final finished lumber pieces. It is common practice to provide saw-guide assemblies comprising guidebars with or without babbitt pads interposed between individual blades to maintain their spacing and to minimize the extent of vibration that may occur. The sawguide assemblies are securely fixed into place between the individual circular blades by engagement with equipment frame rails or other support elements to provide stability to the saw blades prior to commencing operations. Some sawguide assemblies are provided with channels within the guidebars for flowing coolant therethrough to cool the individual circular saw blades. However, because of the extent of pressures exerted against the circular gang saws by cants and flitches, the spacing between the sawguides and saws may become skewed a few degrees on either side of the perpendicular plane relative to the arbor axis, thereby resulting in increased variability in the dimensions of the functional lumber pieces. Consequently, the operations have to be stopped so that sawguide assemblies can be partially disengaged from their mountings onto the equipment frame rails or supports, so their positioning can be adjusted to provide maximal contact and truing support to the individual sawblades. Such positioning and adjustments are often needed several times during a work shift resulting in reduced productivity and increased operating costs.

SUMMARY OF THE DISCLOSURE

Some exemplary embodiments of the present disclosure pertain to two-part pivotably adjustable block components that are mountable onto sawguide posts of sawguide assemblies for circular gang saw assemblies. One aspect relates to two-part pivotably adjustable block components wherein one of the two parts is integrally incorporated into a sawguide post. One of the blocks i.e., a first block, is provided with a downward-extending shoulder portion. The other block i.e., the second block, is provided with an inwardly receding seat portion for receiving the shoulder portion of the first block. The plane of the seat portion in the second block is slightly less from horizontal than is the plane of the shoulder portion in the first block, thereby making it possible to pivotably adjust the first block relative to the second block.

Other exemplary embodiments of the present disclosure pertain to pivotably adjustable sawguide posts for receiving thereon sawguide assemblies for a circular gang saw assemblies. Other exemplary embodiments of the present disclosure pertain to pivotably adjustable sawguide assemblies for a circular gang saw assemblies.

DESCRIPTION OF THE DRAWINGS

The present disclosure will be described in conjunction with reference to the following drawings in which.

DETAILED DESCRIPTION

The embodiments of the present disclosure pertain to two-part pivotable block components that are mountable onto the sawguide posts of sawguide assemblies for circular gang saws.

Figure 1:
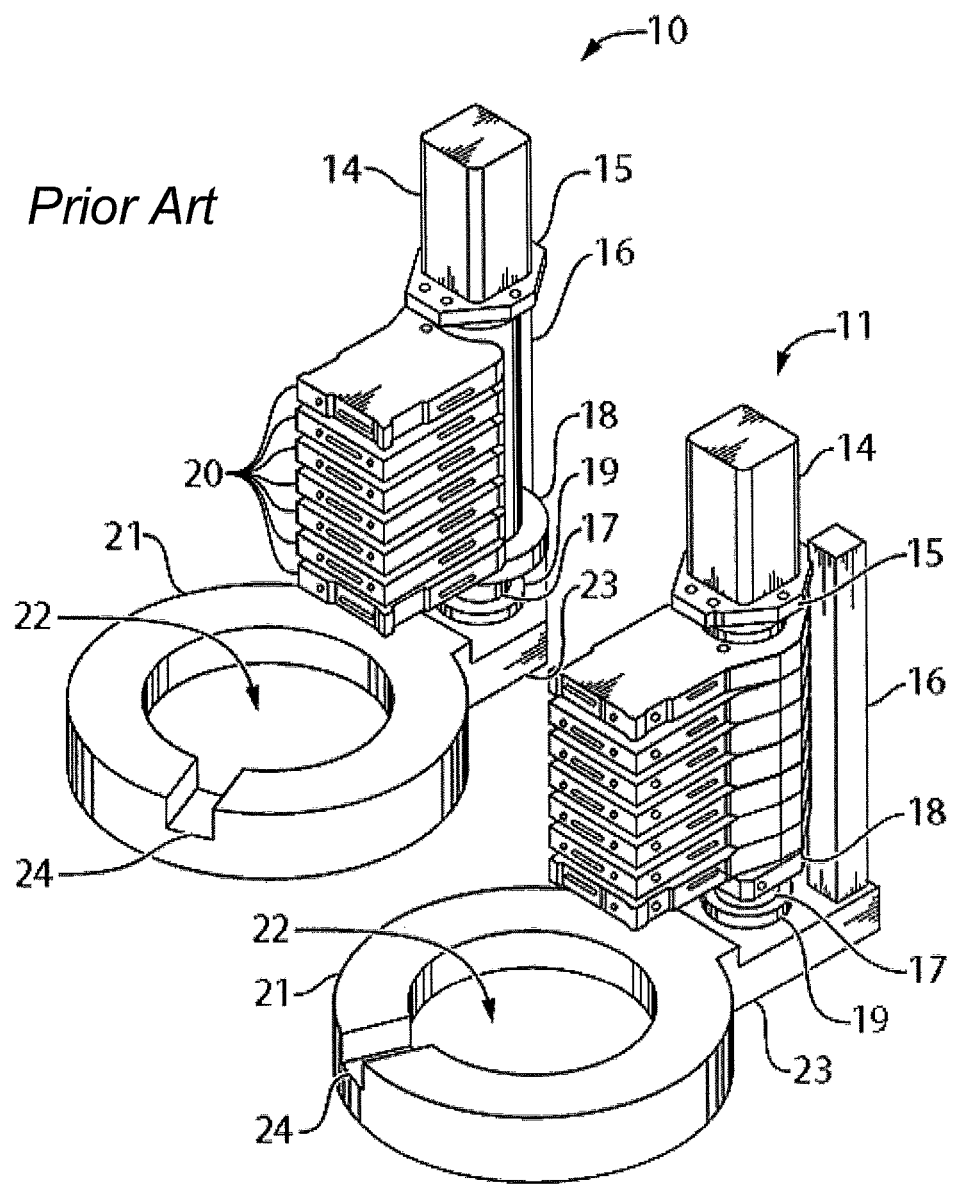
FIG. 1 is a perspective view of a pair of matched prior art sawguide assemblies.

A prior art arrangement of sawguide assemblies is shown in FIG. 1. Sawguide assemblies are typically provided as matched pairs 10, 11, wherein one 10 of the pair is mounted into a position on a gang edger saw such that it can engage with and cooperate with a first circular gang saw assembly that engages one side of a cant or flitch, while the other 11 of the pair is mounted into a position where it can interact and cooperate with a second circular gang saw assembly positioned to concurrently engage the opposite side of the cant or flitch. Each sawguide assembly generally has a circular mounting plate 21 provided with an aperture 22 for receiving therethrough the arbor of a circular gang saw assembly (not shown). The circular mounting plate 21 also has a detent 23 onto which is engaged a sawguide post 17 by a retaining ring 19. A waterblock 18 is fixed onto the sawguide post 17. A series of sawguides 20 is mounted onto the waterblock 18 and secured in place by a top clamp base 15 and a top clamp 14. A series of channels (not shown) interconnects the individual sawguides 20 with a channel (not shown) in the waterblock 18 for flowing a coolant therethrough to cool sawblades (not shown) during operation. The series of sawguides 20 is configured to rotate laterally about the sawguide post 17 as the sawguide assemblies 10, 11 engage and disengage from circular gang saw assemblies (not shown) during operation. A stationary sawguide bar 16 fixedly engaged with the detent 23 of the mounting plate 21, limits the lateral travel of the sawguides 20 as the sawguide assemblies 10, 11 engage with and disengage from circular gang saw assemblies (not shown) during operation.

Because of the extent and magnitude of the pushing pressures by cants and flitches that are constantly exerted against the circular gang saw assemblies during high-speed high-throughput operations, the individual circular sawblades are forced out of alignment against the individual sawguides 20 thereby also forcing the sawguides out of alignment. Consequently, in typical commercial forestry sawmill operations, circular gang edger sawing equipment and circular gang re-sawing equipment have to be shut down at least three to six times during an eight-hour shift for realigning of the individual sawblades and the individual sawguides. The realignment processes often take an hour or more to complete, depending on how many circular gang saws and sawguide assemblies are installed on the circular gang edger sawing equipment and circular gang re-sawing equipment. Consequently, considerable downtown occurs with the prior art equipment resulting in losses of production efficiency and increased operating costs.

Some exemplary embodiments of the present disclosure pertain to two-part pivotable block components for mounting onto sawguide posts of sawguide assemblies for circular gang saw assemblies. Other exemplary embodiments of the present disclosure pertain to pivotably adjustable sawguide posts for receiving thereon sawguide assemblies for a circular gang saw assemblies. Other exemplary embodiments of the present disclosure pertain to pivotably adjustable sawguide assemblies for a circular gang saw assemblies.

Figure 2:
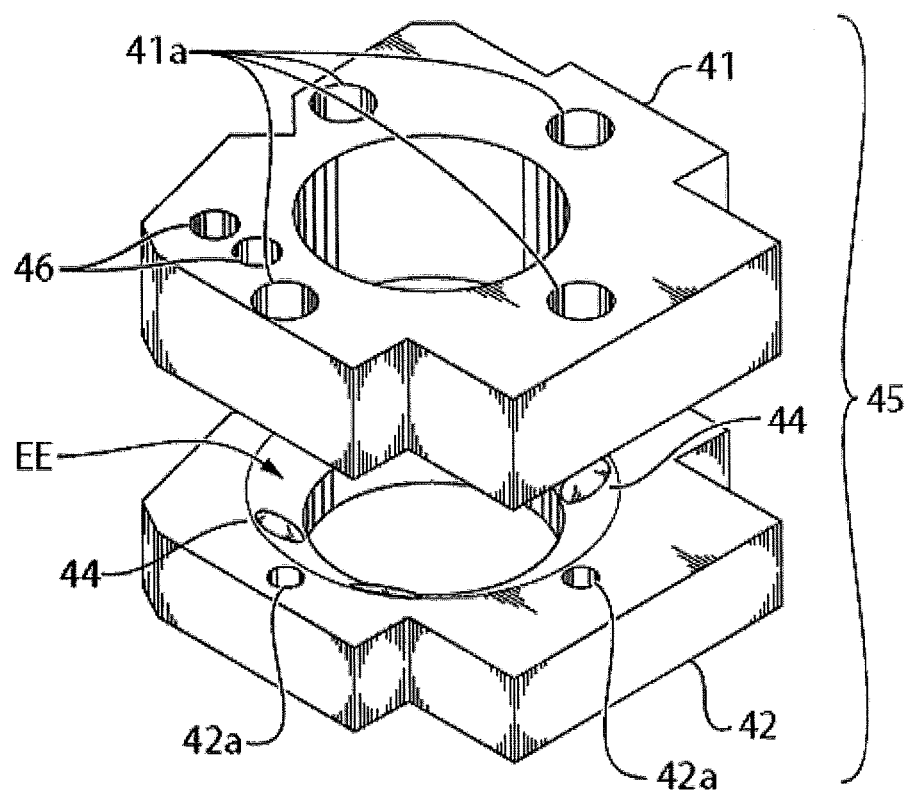
FIG. 2 is an exploded perspective view of an exemplary pivotable water block component according to an exemplary embodiment of the present disclosure.
Figure 3:
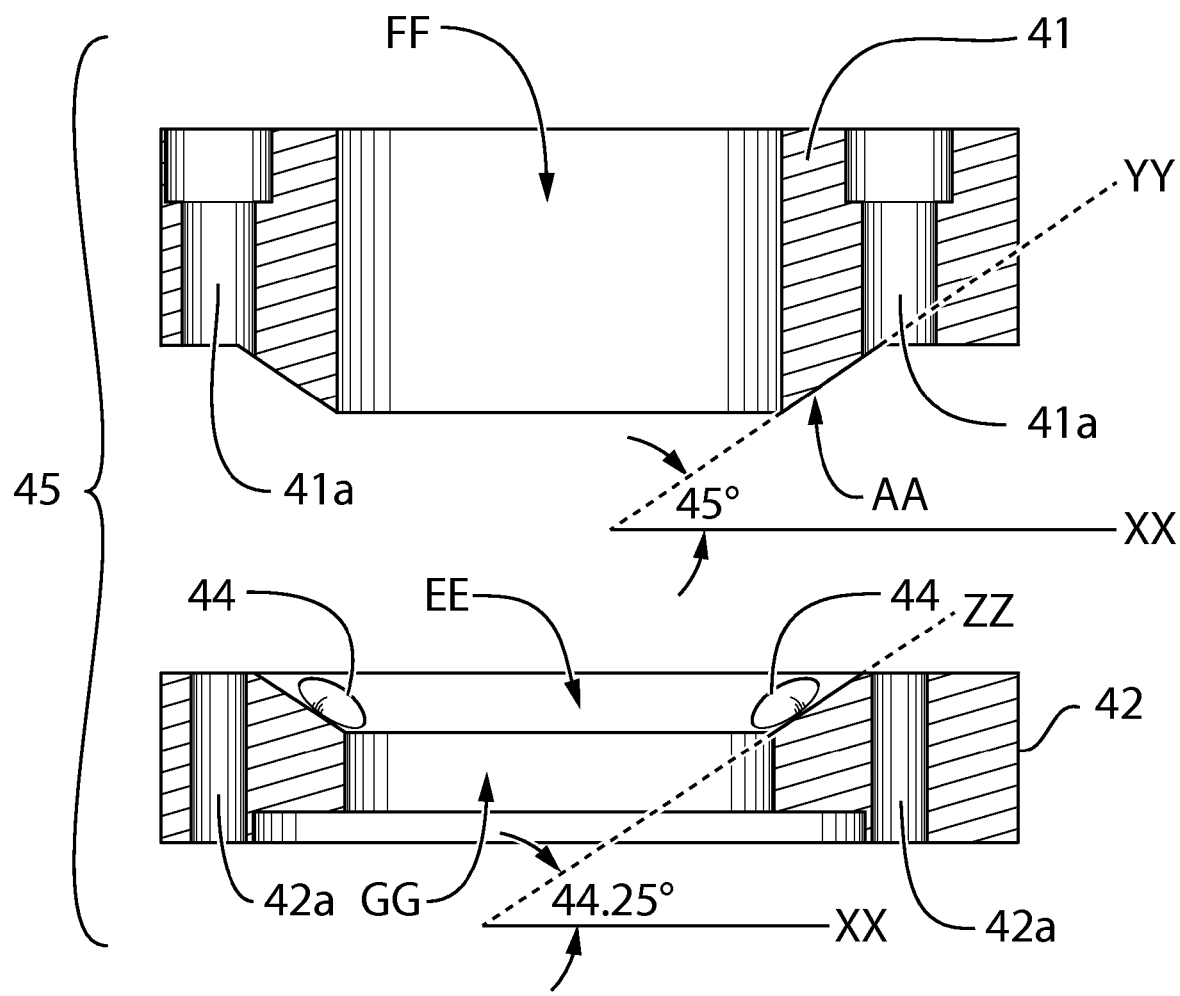
FIG. 3 is an exploded cross-sectional view of the pivotable water block component from FIG. 2.

Exemplary two-part pivotable waterblock components 45 of the present disclosure are shown in FIGS. 2-5. The waterblock component 45 comprises an upper block 41 and a matched lower block 42. The upper block 41 is provided with threaded bores 41a aligned with bores 42a for receiving and engaging aligning bolts 61. Alternatively, the lower block may be provided with threaded bores for engaging aligning bolts inserted through bores provided therefore in the upper block. The exemplary upper block 41 shown in FIG. 2 is provided with a channel having orifices 46 for receiving and conveying a coolant to sawguides (see 40 in FIG. 6). The upper block 41 is provided with a bore FF for receiving and engaging a sawguide post. The upper block 41 is provided with an outwardly inclined downward extending shoulder AA having a plane relative to a horizontal plane, selected from a range of about 10° to about 45°. A suitable plane is about 10°, about 12.5°, about 15°, about 17.5°, about 20°, about 22.5°, about 25°, about 27.5°, about 30°, about 32.5°, about 35°, about 37.5°, about 40°, about 42.5°, about 45°, about 47.5°, about 50°, and anywhere therebetween. The lower block 42 is provided with a bore GG that has a larger diameter than bore FF provided in upper block 41. It is preferable that the diameter of bore GG provides a gap between the lower block 42 and a sawguide post extending therethrough, of about 2 mm, about 3 mm, about 4 mm, about 5 mm, about 6 mm, about 7 mm, about 8 mm, about 9 mm, about 10 mm, and anywhere therebetween. The lower block 42 is provided with an inwardly receding inclined shoulder EE having a plane relative to the plane of the outwardly extending shoulder AA, that is offset to a more horizontal plane by about 0.25°, about 0.50°, about 0.75°, about 1.0°, about 1.25°, about 1.5°, about 1.75°, about 2.0°, about 2.25°, about 2.5°, about 2.75°, about 3.0°, about 3.5°, about 4.0°, about 4.5°, about 5.0°, and anywhere therebetween. Thus, in one embodiment shown in FIG. 3, shoulder AA may be in a first plane YY having an angle of 45° from a horizontal plane XX, and shoulder EE may be in a second plane ZZ having an angle of 44.25° from the horizontal plane XX. The offset in the planes between the outwardly inclined shoulder AA of upper block 41 and the inwardly receding inclined shoulder EE of lower block 42 enables precise pivotable adjustments of a sawguide post integrally engaged with the upper block 41 in a three-dimensional space by sequentially loosening and tightening each of aligning bolts 61. If so desired, one or more convex caps 44 may be provided on the upper shoulder AA or the lower shoulder EE to facilitate the ease of pivotable adjustments of the waterblock component 45 of the present disclosure after its installation into a sawguide assembly. It is optional and within the scope of the present disclosure to provide the lower block with an outwardly inclined upward extending shoulder, and to provide the upper block with the inwardly receding inclined shoulder.

Figure 4:
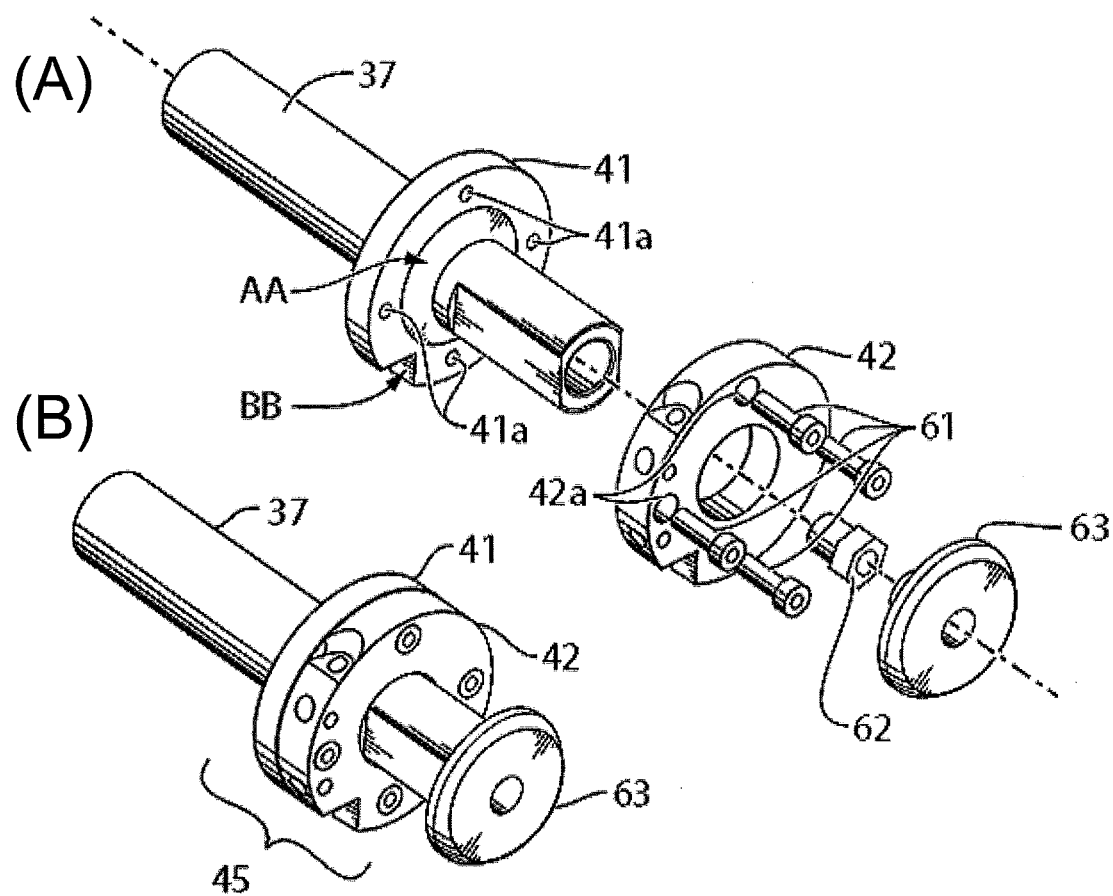
FIG. 4(A) is an exploded perspective view of another exemplary pivotable water block component being mounted onto a sawguide post, and 4(B) is perspective view showing the pivotable water block component mounted onto the sawguide post.
Figure 5:
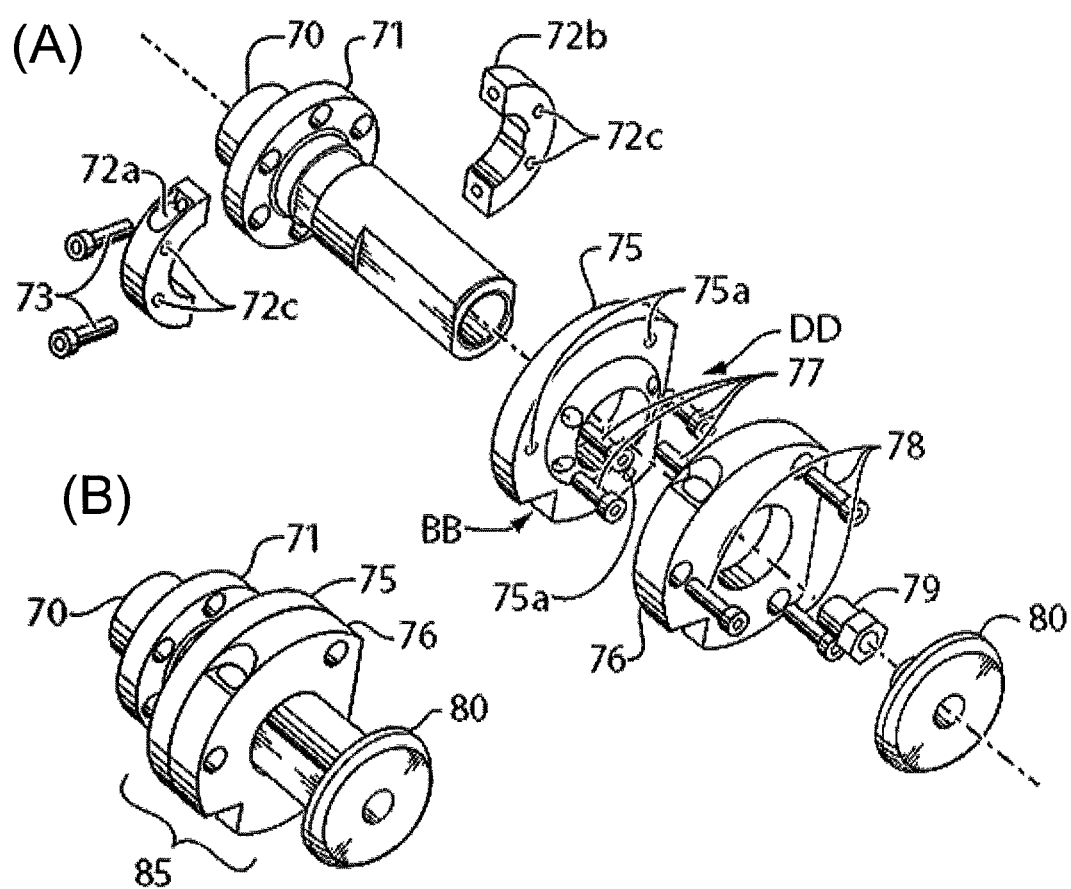
FIG. 5(A) is an exploded perspective view of another exemplary pivoting water block component being mounted onto a sawguide post that forms a matching pair with the sawguide post from FIGS. 4, and 5(B) is perspective view showing the pivoting water block component mounted onto the sawguide post.

FIGS. 4 and 5 illustrate installment of the two-part pivotable waterblock components 45 of the present disclosure onto sawguide posts. FIG. 4 shows the upper block 41 integrally machined into a sawguide post 37. The lower block 42 is pivotably engaged to the upper block 41 by aligning bolts 61. An end cap 63 is then secured to the bottom of the sawguide post 37 by threaded insert 62. In this example, the upper block 41 and the lower block 42 are provided with aligned indents BB for aligning the sawguide assembly against a sawguide bar after the assembly is installed into a circular gang edger sawing equipment or a circular gang re-sawing equipment. Alternatively, the upper block of the two-part pivotable waterblock component may be securely engaged onto a sawguide post by any method known to those skilled in these arts exemplified by press-fitting, welding, providing the inner bore with female threads for engaging male threads provided therefor on the sawguide post, and the like. As illustrated in FIG. 5, a sawguide post 70 may be provided with an integral mounting flange 71. A split collar 72a, 72b is then installed onto the sawguide post 70 underneath the mounting flange 71 and secured in place by set screws 73. The upper block 75 of the two-part pivotable waterblock component 85 is securely mounted onto the sawguide post 70 by threadably engaging socket head cap screws 77 inserted through bores provided therefor in the upper block 75, with threaded bores 72c provided in the split collar 72a, 72b. The lower block 76 is then pivotably engaged with the upper block 75 by socket head cap screws 78, inserted through bores provided therefore in the lower block 76, with threaded bores 75a provided in the upper block 75. An end cap 80 is then secured to the bottom of the sawguide post 70 by threaded insert 79. In this example, the upper block 75 and the lower block 76 are provided with (i) aligned indents BB for aligning the sawguide assembly against a sawguide bar, and (ii) opposite to the aligned indents BB, with aligned straight edges DD, to facilitate alignment of the assembled sawguide assembly with a circular gang saw assembly after installation into a circular gang edger sawing equipment or a circular gang re-sawing equipment. It optional and within the scope of the present disclosure to provide the upper block with one or channels for communicating with a supply of coolant and flowing the coolant to sawguides installed onto sawguide posts.

Figure 6:
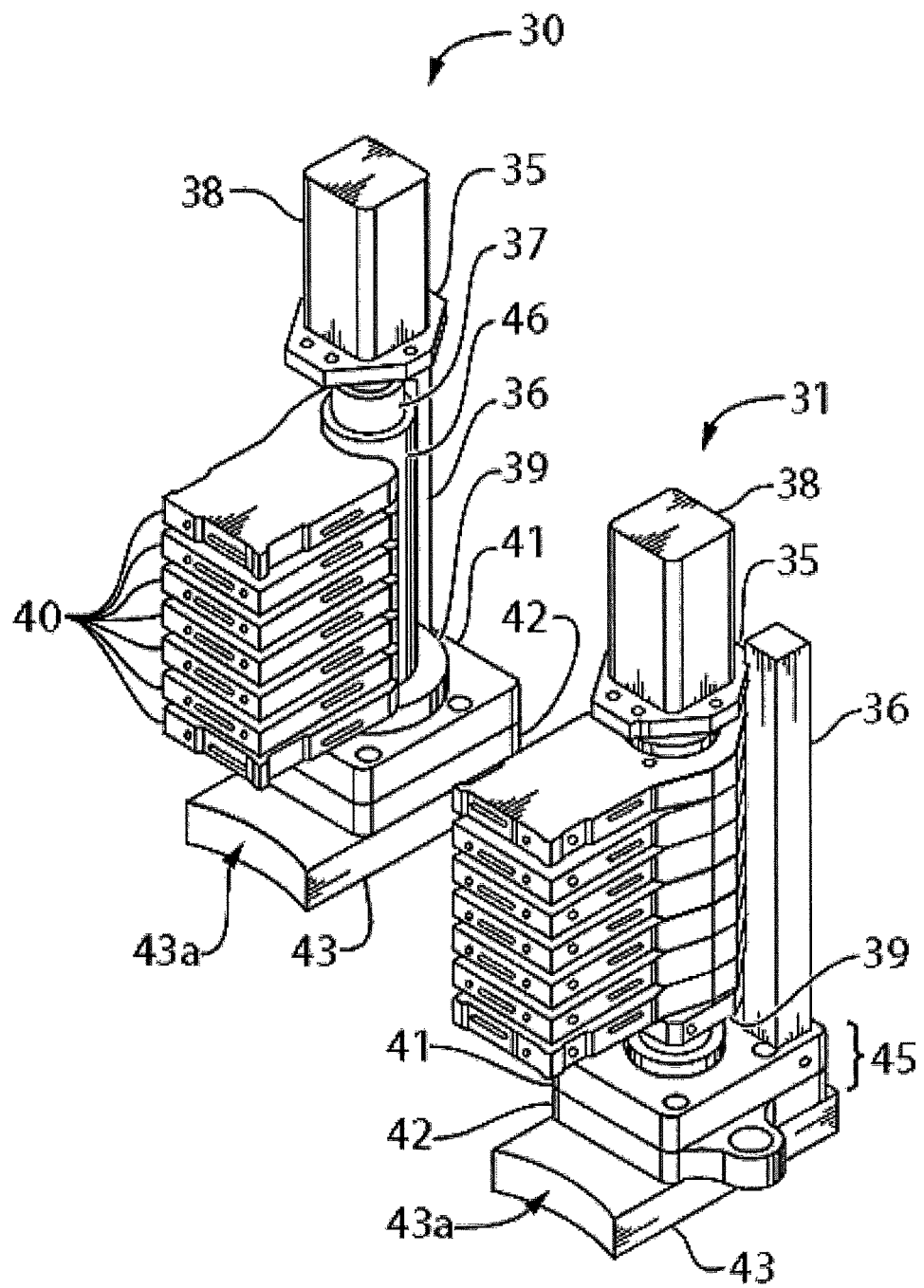
FIG. 6 is a perspective view of a pair of exemplary matched sawguide assemblies according to another exemplary embodiment of the present disclosure.
Figure 7:
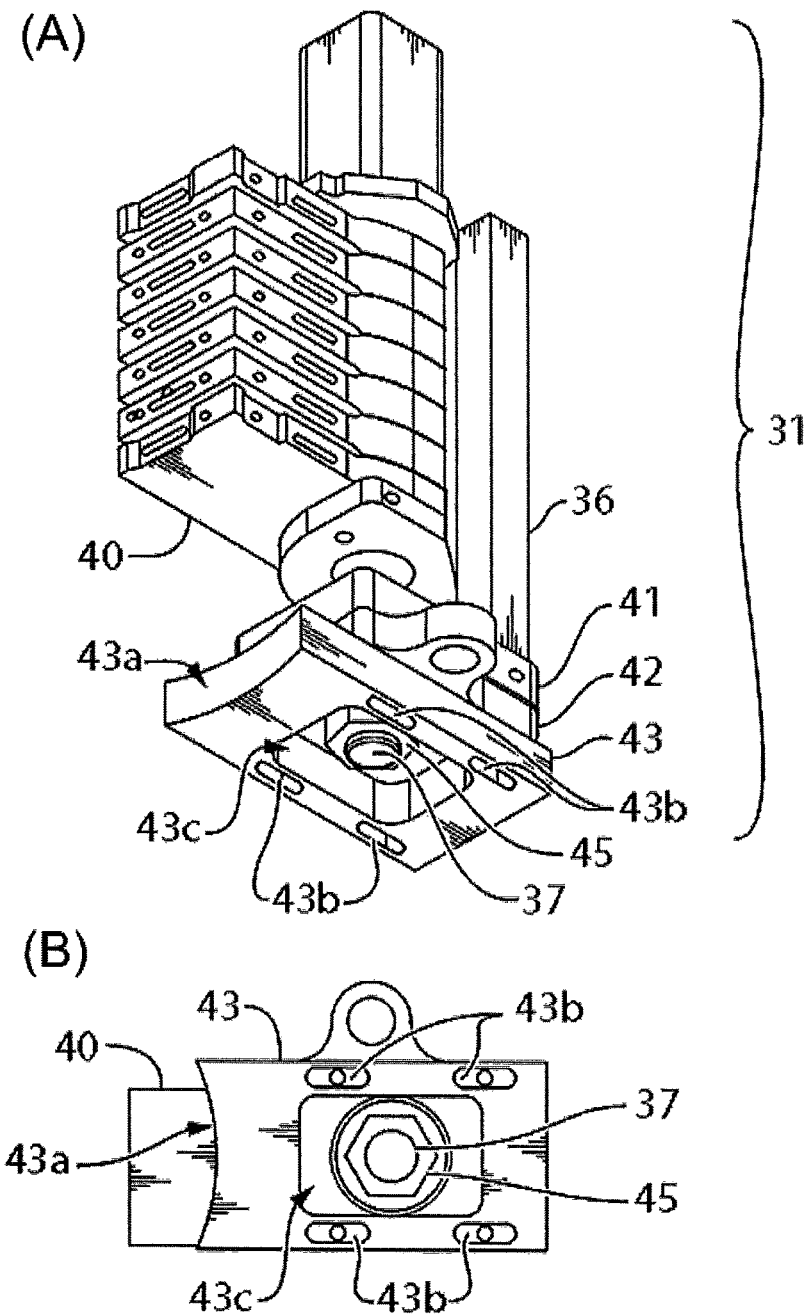
FIG. 7(A) is a perspective view from the bottom and 7(B) is a bottom view of a single sawguide assembly from FIG. 6.
Figure 8:
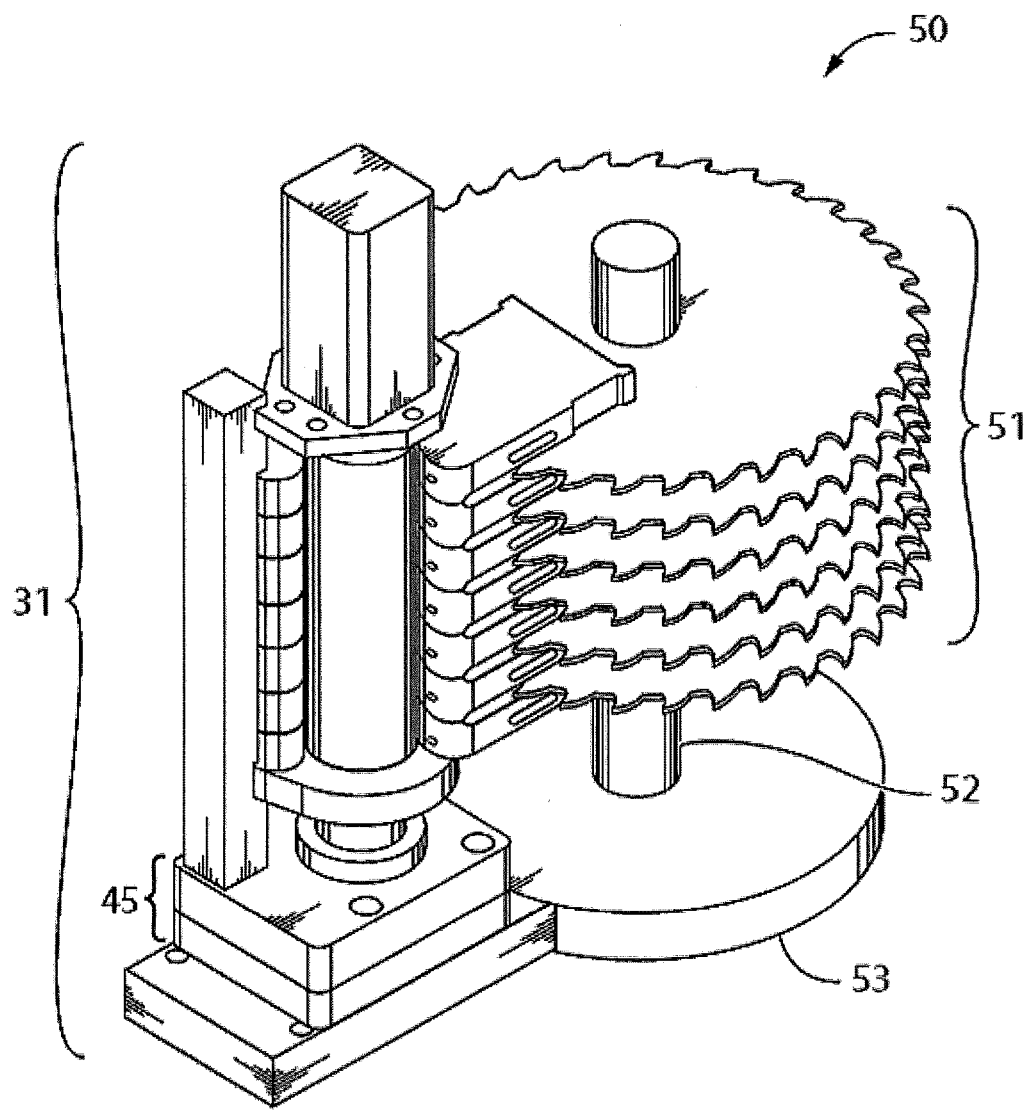
FIG. 8 is perspective view showing a single sawguide assembly from FIG. 6 engaged with a circular gang saw assembly.
Figure 9:
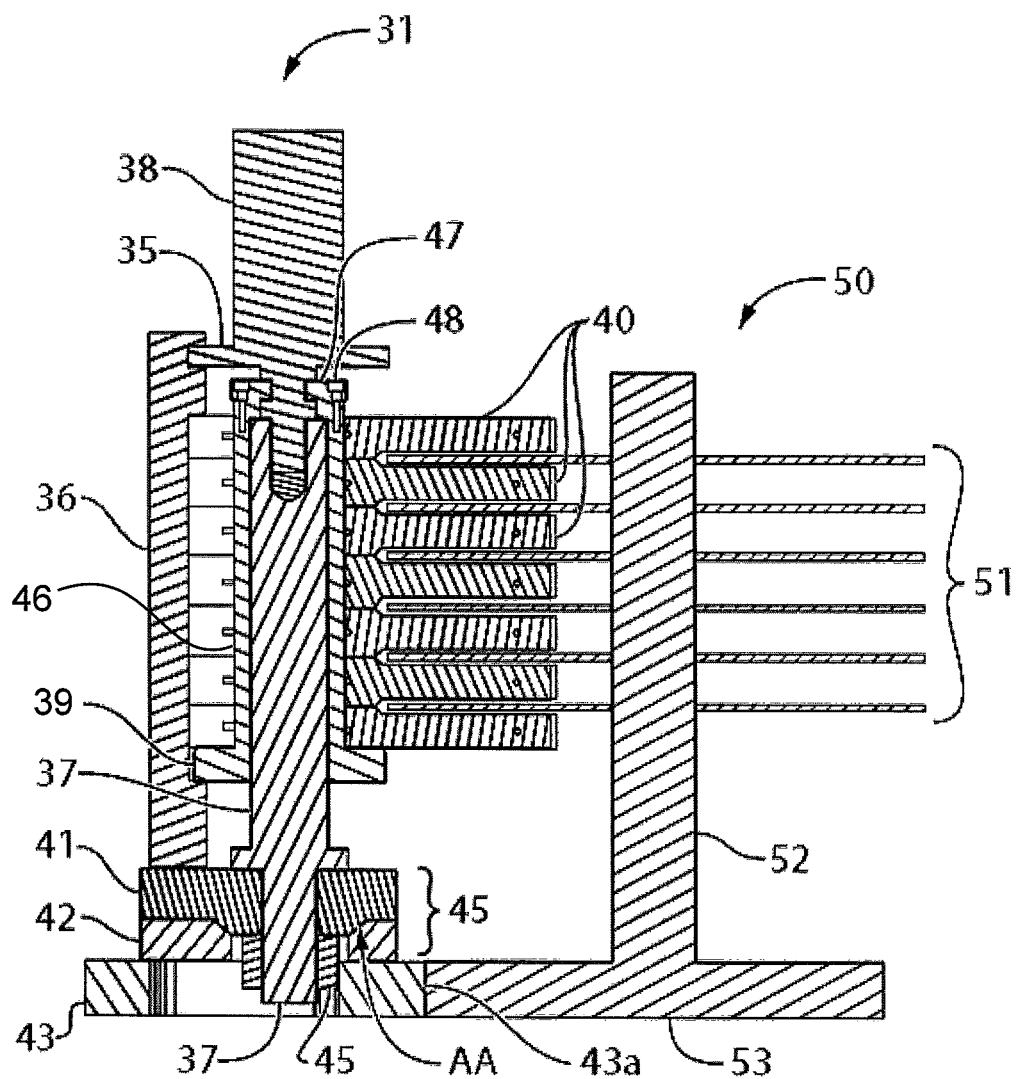
FIG. 9 is a cross-sectional side view showing the engaged sawguide assembly and circular gang saw assembly from FIG. 8.

FIGS. 6 and 7 illustrate exemplary assembled sawguide assemblies 30,31 incorporating the two-part pivotable waterblock components 45 of the present disclosure. FIGS. 8 and 9 show an assembled sawguide assembly 31 engaged with and cooperating with a circular gang saw assembly 50. After the upper block 41 and the lower block 42 of the pivotable waterblock component 45 are installed onto a sawguide post 37, an exemplary base plate 43 according to another embodiment of the present disclosure, is abutted to the bottom of the lower block 42 and secured to the sawguide post 37 by a retaining nut 45 (FIG. 7(B)). Instead of an annular base plate that receives and communicates with the arbor, or alternatively with an arbor plate, of a circular gang saw assembly (e.g., base plate 21, FIG. 1), the exemplary base plate 43 of the present disclosure is provided with a concave edge 43a for contacting and communicating with the arbor 52 or and/or plate 53 of a circular gang saw assembly (FIG. 9). The base plate 43 is provided with a plurality of horizontally elongate bores 43b for receiving therethrough mounting bolts for securing the assembled sawguide assembly 31 to a circular gang edger sawing equipment or a circular gang re-sawing equipment. The plurality of horizontally elongate bores 43b enable rapid positioning and re-positioning of the sawguide assembly 31 about the circular gang saw assembly 50. After the base plate 43 is secured to the bottom of the sawguide post 37, a sleeve 46 is slid over the sawguide post 37.

The sleeve 46 has an integral waterblock 39 that contacts a sawguide bar 36 which is separately attached and secured to the upper block 41. Then, individual sawguides 40 are attached in pairs on top of the waterblock 39 of sleeve 46. The proximal ends of the sawguides 40 are positioned to contact the sawguide bar 36. The proximal ends of each pair of sawguides 40 form a channel for receiving and communicating with a circular saw blade from a circular saw blade assembly 51 of a circular gang saw assembly 50 (FIG. 9). After the appropriate number of sawguides 40 have been installed onto the sleeve 36, i.e., to engage and communicate with each individual circular saw comprising the circular saw assembly 51, the sawguides 40 are further secured in place by a top plate 47 mounted onto the top of the sleeve 46 by set screws 48 (FIG. 9). A clamp base 35 is then placed over the top plate 47 and secured to the sawguide post 37 by a top clamp 38.

The exemplary two-part pivotable waterblock components of the present disclosure, alone and in combination with the exemplary bottom plates having concave edges for adjustably contacting the arbors or arbor plates of circular gang saw assemblies, significantly reduce the time for repositioning, adjusting, and/or aligning installed sawguide assemblies relative to circular gang saw assemblies that they are cooperating with. For example, the vertical positioning of a sawguide assembly can be easily adjusted within a three-dimensional space about a circular gang saw assembly simply by sequentially loosening and tightening the aligning bolts that pivotably engage to the upper block and lower block comprising the two-part waterblock component of the present disclosure. The lateral orientation of the sawguide assembly relative to the circular gang saw assembly simply by can be easily and quickly re-positioned simply by loosening the mounting bolts engaging bottom plate of the sawguide assembly with a circular gang edger sawing equipment or a circular gang re-sawing equipment, then sliding the sawguide assembly forward or backward as permitted by the horizontally elongate bores provided in the bottom plate, and then re-tightening the mounting bolts.

Those skilled in these arts will understand that the two-part pivotable block components of the present disclosure are useful for mounting interposed the bases of industrial equipment and their mounts, for facilitating rapid alignment and re-alignments. Such industrial equipment is exemplified by electrical motors, hydraulic-driven motors, pressure-driven motors and the like equipped with pulleys for driving auxiliary equipment with belts, or alternatively equipped with gears for communicating rotational forces to chains. In these applications, the two-part pivotable block components will facilitate tensioning adjustments to the belts and chains, and also will facilitate alignment of the pulleys and/or gears mounted onto the motors with the pulleys and/or gears mounted onto the auxiliary equipment. The two-part pivotable block components of the present disclosure are also useful for mounting interposed the bases of pumps and their mounts, to enable rapid alignment of ingressing ports or egressing ports provided on pumps with conduits supplying or receiving flows of fluids to or from the pumps. The two-part pivotable block components of the present disclosure are also useful for enabling use of mismanufactured arbors wherein their longitudinal axes may be slightly offset. Installation of a two-part pivotable block component of the present disclosure onto a mismanufactured arbor will enable precise alignment of the arbor with its intended assemblies and/or equipment.

What is claimed is:

1. A two-part pivotable block component for mounting onto a sawguide post of a sawguide assembly for a circular gang saw for adjusting vertical positioning of the sawguide assembly within a three-dimensional space about a circular gang saw assembly, the two-part pivotable block component comprising:

an upper first part that is engagible with the sawguide post; and a lower second part having an orifice for receiving therethrough the sawguide post, wherein the first part has a first inclined surface in a first plane for pivotably and slidingly engaging a second inclined surface provided on the second part, wherein the second inclined surface is in a second plane, wherein the first inclined surface in the first plane is at an angle defined by a first angle from a horizontal plane, wherein the second inclined surface in the second plane is at an angle defined by a second angle from the horizontal plane, wherein the first angle and the second angle are different angles, and wherein the first part of the two-part pivotable block component is provided with one or more channels for receiving a flow of a coolant therethrough.

2. The two-part pivotable block component of claim 1, wherein the inclined surface of the first part of the two-part pivotable block component is outwardly extending and the inclined surface of the second part of the two-part pivotable block component is inwardly receding.

3. The two-part pivotable block component of claim 1, wherein the inclined surface of the first part of the two-part pivotable block component is inwardly receding and the inclined surface of the second part of the two-part pivotable block component is outwardly extending.

4. The two-part pivotable block component of claim 1, wherein the one or more channels is communicable with a plurality of channels provided therefore in a plurality of saw guides mountable onto the sawguide post.

5. The two-part pivotable block component of claim 1, wherein the inclined surface of the first part of the two-part pivotable block component is provided with at least one convex cap extending outward therefrom.

6. The two-part pivotable block component of claim 1, wherein the inclined surface of the second part of the two-part pivotable block component is provided with at least one convex cap extending outward therefrom.

7. The two-part pivotable block component of claim 1, wherein the second inclined surface is offset from the first inclined surface by about 0.25°-5.0°.

8. The two-part pivotable block component of claim 1, wherein when the vertical positioning of the sawguide assembly is skewed from a perpendicular direction, the two-part pivotable block component aligns the sawguide assembly.

9. A pivotably adjustable sawguide post for receiving thereon a sawguide assembly for a circular gang saw, comprising:
   a sawguide post; and
   the two-part pivotable block component of claim 1, wherein the upper first part is integrally incorporated into the sawguide post.

10. A pivotably adjustable sawguide post for receiving thereon a sawguide assembly for a circular gang saw, wherein vertical positioning of the sawguide post is adjustable within a three-dimensional space about the circular gang saw, the pivotably adjustable sawguide post comprising:
   a sawguide post; and
   a two-part pivotable block component having an upper first part that is engaged with the sawguide post and a lower second part that has an orifice for receiving therethrough the sawguide post, the first part having a first inclined surface in a first plane for pivotably engaging a second inclined surface provided on the second part, wherein the second inclined surface is in a second plane,
   wherein the first inclined surface in the first plane is at an angle defined by a first angle from a horizontal plane,
   wherein the second inclined surface in the second plane is at an angle defined by a second angle from the horizontal plane,
   wherein the first angle and the second angle are different angles, and
   wherein the first part of the two-part pivotable block component is provided with a channels for receiving a flow of a coolant therethrough.

11. The pivotably adjustable sawguide post of claim 10, wherein the inclined surface of the first part of the two-part pivotable block component is outwardly extending and the inclined surface of the second part of the two-part pivotable block component is inwardly receding.

12. The pivotably adjustable sawguide post of claim 10, wherein the inclined surface of the first part of the two-part pivotable block component is inwardly receding and the inclined surface of the second part of the two-part pivotable block component is outwardly extending.

13. The pivotably adjustable sawguide post of claim 10, wherein the one or more channels is communicable with a plurality of channels provided in a plurality of saw guides mountable onto the sawguide post.

14. The two-part pivotable block component of claim 10, wherein the inclined surface of the first part of the two-part pivotable block component is provided with at least one convex cap extending outward therefrom.

15. The two-part pivotable block component of claim 10, wherein the inclined surface of the second part of the two-part pivotable block component is provided with at least one convex cap extending outward therefrom.

16. The pivotably adjustable sawguide post of claim 10, wherein the second inclined surface is offset from the first inclined surface by about 0.25°-5.0°.

17. The pivotably adjustable sawguide post of claim 10, wherein when the vertical positioning of the sawguide assembly is skewed from a perpendicular direction, the two-part pivotable block component aligns the sawguide assembly.

* * * * *